US012561655B2

(12) United States Patent
Suriyanarayanan et al.

(10) Patent No.: US 12,561,655 B2
(45) Date of Patent: Feb. 24, 2026

(54) ACTIVE META DATA BASED TRANSACTION AMALGAMATION OFFSET IN BLOCKS TO INCREASE CARBON EFFICIENCY

(71) Applicant: Bank of America Corporation, Charlotte, NC (US)

(72) Inventors: Gowri Sundar Suriyanarayanan, Chennai (IN); Maneesh Kumar Sethia, Hyderabad (IN); Abhijit Behera, Hyderabad (IN); Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/595,767

(22) Filed: Mar. 5, 2024

(65) Prior Publication Data
US 2025/0285088 A1 Sep. 11, 2025

(51) Int. Cl.
*G06Q 20/06* (2012.01)
*G06Q 30/018* (2023.01)

(52) U.S. Cl.
CPC ......... *G06Q 20/065* (2013.01); *G06Q 30/018* (2013.01)

(58) Field of Classification Search
CPC ........................... G06Q 20/065; G06Q 30/018
See application file for complete search history.

(56) References Cited

U.S. PATENT DOCUMENTS

| | | | |
|---|---|---|---|
| 9,569,771 B2 | 2/2017 | Lesavich et al. | |
| 10,853,354 B2 | 12/2020 | Quick et al. | |
| 11,212,076 B2 | 12/2021 | Raman et al. | |
| 11,436,378 B2 | 9/2022 | Vijayasankar et al. | |
| 11,509,464 B2 | 11/2022 | Gutierrez-Sheris | |
| 11,569,982 B2 | 1/2023 | Sardesai et al. | |
| 11,570,002 B2 | 1/2023 | Jayachandran | |
| 11,698,840 B2 | 7/2023 | Liao | |
| 2017/0337534 A1 | 11/2017 | Goeringer et al. | |
| 2020/0044824 A1* | 2/2020 | Xie | G06Q 20/10 |
| 2021/0334176 A1* | 10/2021 | Sears | G06F 21/602 |

FOREIGN PATENT DOCUMENTS

| | | |
|---|---|---|
| CN | 108932348 B | 6/2020 |
| EP | 3355513 B1 | 10/2020 |
| EP | 3499789 B1 | 6/2021 |

OTHER PUBLICATIONS

Alzoubi, Yehia Ibrahim, Alok Mishra. "Green Blockchain—A Move Toward Sustainability," Journal of Cleaner Production, https://www.sciencedirect.com/science/article/pii/S0959652623036995 (Nov. 9, 2023). (Year: 2023).*

(Continued)

*Primary Examiner* — Elizabeth H Rosen
(74) *Attorney, Agent, or Firm* — Banner & Witcoff, Ltd.

(57) ABSTRACT
Processes and apparatus are disclosed to amalgamate multiple cryptocurrency transactions inside a single transaction with the help of active meta data which results in an increase of the number of transactions in a single block instead of storing the transactions across multiple blocks in a blockchain. By using individual blocks more efficiently, Tradable Performance Standards (TPS) and carbon efficiencies are increased.

18 Claims, 4 Drawing Sheets

(56) References Cited

OTHER PUBLICATIONS

Kottursamy, Kottilingam, Banupriya Sadayapillai, Ahmad Ali AlZubi, Ali Kashif Bashir. "A Novel Blockchain Architecture with Mutable Block and Immutable Transactions for Enhanced Scalability," Sustainable Energy Technologies and Assessments, (Jun. 19, 2023). (Year: 2023).*

Ivanova-Banda, Nadia. "Transaction Batching 101, or How to Streamline Crypto Transactions," https://blog.ambire.com/transaction-batching-explained/ (Oct. 10, 2023). (Year: 2023).*

* cited by examiner

400

ACTIVE META DATA BASED TRANSACTION AMALGAMATION OFFSET IN BLOCKS TO INCREASE CARBON EFFICIENCY

FIELD OF USE

The present disclosure relates to processes and apparatus for addressing memory wherein the processes and apparatus involve significant data manipulating, combining, translating, mapping, amalgamating, merging, and other techniques for formatting and modifying data for storage. More particularly, processes and apparatus for amalgamating multiple transactions inside a single transaction using active meta data to increase transaction data stored in a single block rather than multiple blocks in a blockchain resulting in increased carbon efficiency and less carbon emissions.

BACKGROUND

Blockchain technology is a decentralized and distributed digital ledger maintained by a computer network. Blockchain technology has a significant carbon footprint due to its energy-intensive process of verifying transactions and creating new blocks on the blockchain. The energy consumption of blockchain technology results in significant greenhouse gas emissions, which allegedly contribute to climate change. The energy consumption of blockchain technology can be attributed to verifying transactions and creating new blocks on the blockchain. In essence, creating and verifying blocks in a blockchain uses a large number of Graphics Processing Units (GPUs), Central Processing Units (CPUs), and Accelerated Processing Units (APUs) which results in more carbon emissions due to increased energy consumption.

It would be advantageous to increase the efficiency of digital and cryptocurrency transactions in a blockchain by using a reduced number of blocks by increasing data storage capacity of the block rather than having to store user transaction and user personal data across multiple blocks in the blockchain to decrease energy consumption. The processes and apparatus disclosed herein may be used to minimize storage and memory waste by verifying transactions and creating new blocks on the blockchain thus decreasing Tradable Performance Standards (TPS) and reducing carbon footprint.

SUMMARY

In light of the foregoing background, the following presents a simplified summary of the present disclosure in order to provide a basic understanding of various aspects of the disclosure. This summary is not limiting with respect to the exemplary aspects of the inventions described herein and is not an extensive overview of the disclosure. It is not intended to identify key or critical elements of the disclosure or to delineate the scope of the disclosure. Instead, as would be understood by a personal of ordinary skill in the art, the following summary merely presents some concepts of the disclosure in a simplified form as a prelude to the more detailed description provided below.

In one aspect of the disclosure, a process for active meta data based transaction amalgamation offset in blocks to increase carbon efficiency in accordance with one or more aspects described herein.

In one aspect of the disclosure, a process for optimizing cryptocurrency transactions to enhance carbon efficiency may comprise the steps of initiating a plurality of transactions by multiple customers through a digital interface, retrieving an Unspent Transaction Output (UTXO) via a UTXO retrieval module for the plurality of transactions, determining a required transaction block size via a transaction amalgamator, amalgamating the plurality of transactions via the transaction amalgamator based on active metadata, sending an amalgamated transaction comprising an amalgamated UTXO to an active meta data module, generating an active meta hash for the combined single transaction and the amalgamated UTXO, generating a single transaction comprising multiple UTXO via an active meta data management system, adding the single transaction comprising multiple UTXO to a block, validating the single transaction comprising multiple UTXO via a decentralized network of nodes, adding transaction entries into a digital ledger and an UTXO management database utilizing the active meta hash for the single transaction comprising multiple UTXO, and updating digital wallets of the multiple customers with transaction outcomes, including a success or a failure status and updated asset balances.

In some examples, the cryptocurrency may be Bitcoin, Ethereum, Tether, Binance Coin, USD Coin, XRP, Terra, Solana, Cardano, Avalanche, or other altcoin. In other examples, the combined transaction active meta hash may include information related to a combined UTXO of the customers, sender information, receiver information, individual UTXO per customer, etc. In some examples, the single transaction comprising multiple UTXO may be generated to meet the required block size. In one example, the transaction amalgamator may select and merge common data between the plurality of transactions by multiple customers to meet a single transaction required block size. In other examples, the generated active meta hash may replace a typical 32-byte transaction hash. In still other examples, amalgamating the plurality of transactions and generating a single transaction comprising multiple UTXO may optimize network or system bandwidth. In some examples, the process may further include the step of calculating a single transaction amount comprising multiple UTXO and generating a composite transaction record that retains detailed information of individual transactions, including sender and receiver details, individual transaction amounts per UTXO, and an aggregated transaction amount. In yet other examples, a number of blocks needed in the blockchain may be minimized. In certain examples, the cryptocurrency transaction may include a carbon footprint, and the cryptocurrency transaction carbon footprint may be reduced or minimized.

In another aspect of the disclosure, a computing apparatus for optimizing cryptocurrency transactions to enhance carbon efficiency may include at least one processor, and memory storing computer-readable instructions that, when executed by the at least one processor, may cause the computing apparatus to initiate a plurality of transactions by multiple customers via a digital interface, retrieve an Unspent Transaction Output (UTXO) via a UTXO retrieval module for the plurality of transactions, determine a required transaction block size via a transaction amalgamator, amalgamate the plurality of transactions via the transaction amalgamator based on active metadata, transmit an amalgamated transaction comprising an amalgamated UTXO to an active meta data module, generate an active meta hash for the combined single transaction and the amalgamated UTXO, generate a single transaction comprising multiple UTXO via an active meta data management system, add the single transaction comprising multiple UTXO to a block, validate the single transaction comprising multiple UTXO via a decentralized network of nodes, add transaction entries into a digital ledger and an UTXO management database utilizing the active meta hash for the single transaction comprising multiple UTXO, update digital wallets of the multiple customers with transaction outcomes, including a success or a failure status, and update asset balances.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
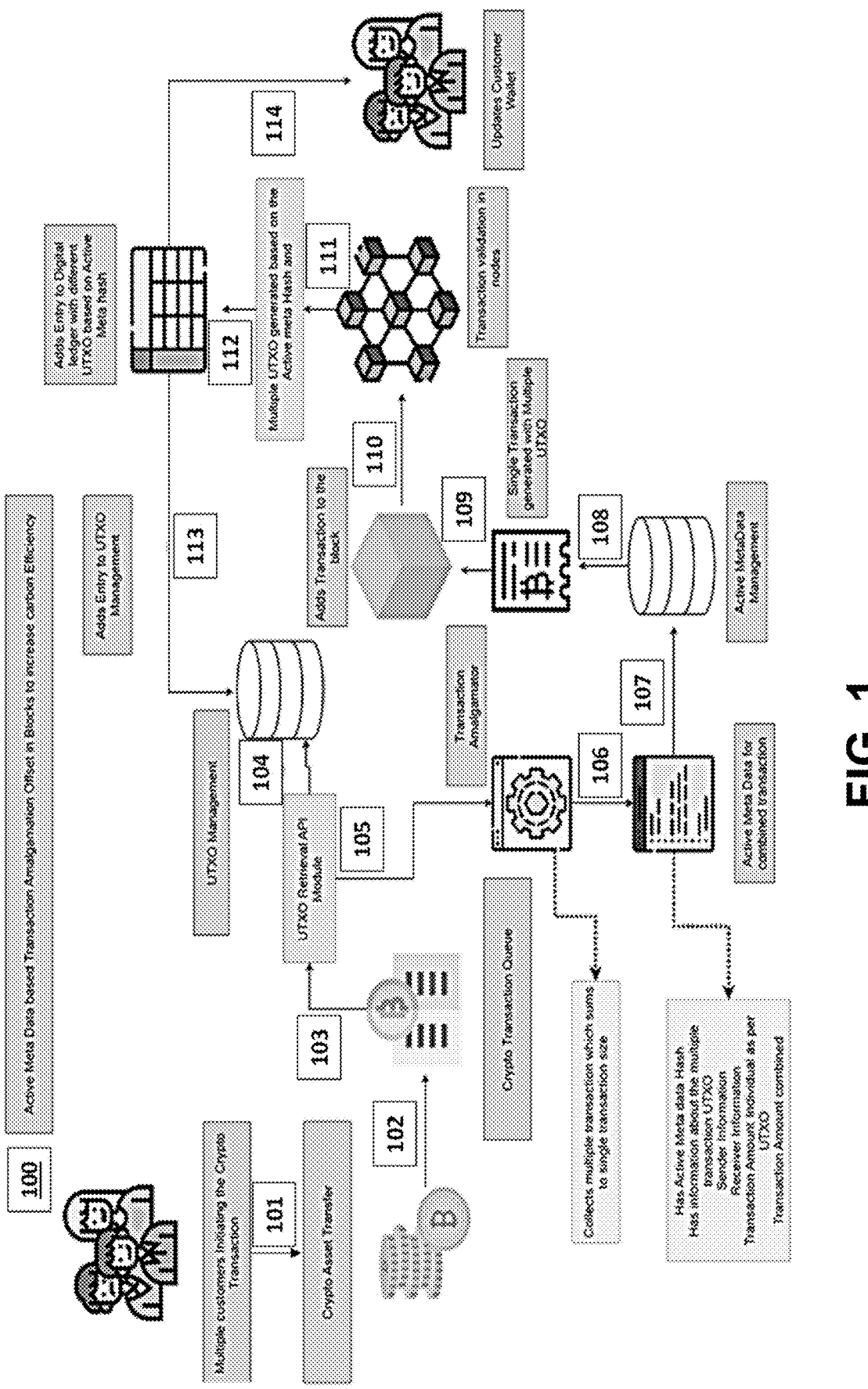
FIG. 1 depicts a sample, functional, architectural-block diagram showing sample interactions, steps, functions, and components of a process, method, system, and apparatus for active meta data based transaction amalgamation offset in blocks to increase carbon efficiency involving users initiating and completing cryptocurrency transactions in accordance with one or more aspects described herein.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, cloud devices, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, portals (internal or external), servers, smart devices, streaming servers, tablets, web servers, and/or workstations, which may have one or more application specific integrated circuits (ASICs), microprocessors, cores, executors, etc., for executing, accessing, controlling, implementing, etc., various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, devices, or the like are to be interpreted broadly as understood by skilled artisans. Further, as used in this specification, computers, machines, devices, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines, etc. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alarms, alerts, applications, application program interfaces (APIs), artificial intelligence, approvals, asymmetric encryption (including public/private keys), attachments, big data, blockchains, blocks, CRON functionality, daemons, databases, datasets, datastores, DeFi functionality, drivers, data structures, deep learning modules (e.g., knowledge graphs, NLP, LSTM, GAN, etc.), distributed ledgers, distributed-ledger blockchains, distributed-ledger hash chains dynamic rule engines, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning (supervised, semi-supervised, unsupervised, or natural language processing), metadata, middleware, modules, namespaces, objects, operating systems, optimization modules, platforms, plugins, processes, protocols, programs, rejections, routes, routines, rule deployment modules, security, scripts, tables, tools, transactions, transformation functionality, user actions, user interface codes, utilities, web application firewalls (WAFs), web servers, web sites, etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol. Decentralized networks (e.g., DeFi networks), in particular, are included in the foregoing and are protected by the information-security aspects of this disclosure.

The foregoing software, computer-executable instructions, data, modules, plugins, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like (e.g., in a decentralized network that may include a consortium of networks, entities, institutions, etc.) including memory and other components thereof. Some or all the foregoing may additionally and/or alternatively be stored similarly and/or in a distributed manner in the network accessible storage/distributed data/ datastores/databases/bigdata/blockchains/distributed-ledger blockchains/distributed ledger hash chains/hash chain network/hashed mesh, etc.

Digital and cryptocurrency transactions in a blockchain may be recorded in blocks through a process that involves several steps. This process ensures the integrity, transparency, and security of transactions on the blockchain, which is the underlying technology of digital transactions, cryptocurrencies like Bitcoin, Ethereum, and many others. A user may initiate a transaction by sending cryptocurrency from their wallet to another person's wallet address. This transaction includes the amount of cryptocurrency being sent, the sender's and recipient's/counterpart's wallet addresses, and typically a transaction cost. The transaction is signed with the sender's private key, serving as a digital signature to verify the authenticity of the transaction and that the sender has the authority to transfer the funds. Once signed, the transaction is broadcasted to the cryptocurrency network, where it is propagated to various nodes (i.e., computers and/or servers in the network). These nodes temporarily hold the transaction in their memory pool (mempool), awaiting confirmation and inclusion in a block. Nodes, or in the case of Bitcoin and many other cryptocurrencies, specialized nodes called miners, verify the transaction. This verification process includes checking the digital signature against the sender's public key and ensuring the sender has sufficient balance to cover the transaction and costs. Verified transactions are collected by miners and grouped together to form a new block. In cryptocurrencies that use Proof of Work, such as Bitcoin, miners compete to solve a complex mathematical puzzle related to the new block. The first miner to solve the puzzle gets the right to add the new block to the blockchain. Other cryptocurrencies may use different consensus mechanisms, such as Proof of Stake (PoS), which selects validators in proportion to their quantity of holdings in the cryptocurrency to create new blocks, or Delegated Proof of Stake (DPoS), which involves election of delegate validators.

Once a block is completed and verified through the validation mechanism, it is added to the blockchain. This new block includes a reference to the hash of the previous block, creating a secure, unbreakable chain of blocks. The addition of the new block to the blockchain is broadcasted across the network. Nodes update their copies of the blockchain to include the new block. This update confirms the transactions contained within the block across the entire network. With the block added to the blockchain, the transactions within it are considered confirmed. This process typically requires a number of additional blocks to be added after the initial block, to ensure irreversibility—a security measure against double spending. In Proof of Work (PoW) systems, the miner who successfully adds a block to the blockchain receives a reward in the form of newly minted cryptocurrency (e.g., Bitcoin) and transaction costs from the transactions within the block. This process ensures that cryptocurrency transactions are securely and transparently recorded on the blockchain, making it extremely difficult to alter historical data or conduct fraudulent transactions without the consensus of the network. The size of a block and the number of transactions it can contain vary depending on the cryptocurrency. For example, Bitcoin blocks are theoretically limited to 1 MB to 4 MB, typically consisting of 3 MB of signature data and 1 MB of transaction data. However, blocks are not used efficiently to store data and multiple blocks are frequently used to store single transaction date. This results in increased energy requirements and thus a larger carbon footprint and deceased carbon efficiencies. The processes and apparatus disclosed herein merge data from multiple transactions into a single transaction in an effort to use the entire data storage capacity of the block thereby reducing carbon footprint as a result of using less blocks and therefore less energy in the aggregate.

As described above, aspects discussed herein relate to a process and apparatus to amalgamate multiple transactions inside single transaction with the help of active meta data which results in an increase of the number of transactions in single block instead of storing the transactions across multiple blocks. By using individual blocks more efficiently, the TPS and carbon efficiencies are increased.

As disclosed herein, a transaction initiated from different customer will be in a queue to be pushed to the block for persistence. A UTXO (Unspent Transaction Output) retrieval module may be used to get the UTXO information of all the transactions. The data may be shared with a transaction amalgamator which may amalgamate multiple transactions to meet single transaction byte size. The UTXO which are amalgamated will be sent to an active meta data module and active meta hash may be generated for the combined UTXO and added to the transaction block. Again, the transaction may be added to the block and when the block is full, it will be pushed for validation by other nodes. Once the block is validated and approved, based on the active meta hash of the transaction, a different UTXO may be created based on the destination information and locked with script for the beneficiary accordingly. The generated UTXO may then be added to the UTXO management and the customers' wallets may be updated accordingly.

As disclosed herein, the process and apparatus of using transaction amalgamation combines multiple UTXOs into a single transaction to avoid excess resource waste. As also disclosed herein, transaction amalgamation may be used to increase the number transactions in a block thus increasing TPS when the block is approved for confirmation in the blockchain. As further disclosed herein, a single transaction section may hold more than one transaction as per the byte size resulting in effectively using the block size to reduce the number of blocks created leading to increased carbon efficiency by using less energy. The process and method used herein will use active meta data to store the information related to multiple transactions which are under amalgamation. As also disclosed herein, active meta hash generates a unique hash to identify the amalgamated transactions. Moreover, the process and apparatus disclosed herein may include a customized transaction structure in which active meta hash may replace the 32 byte transaction hash in the transaction input. Further the process and apparatus disclosed herein may generate, from the amalgamated transactions, multiple UTXOs based upon the active meta data information and secure the UTXO with a lock for designated customers.

Additionally, the process and apparatus disclosed herein may use an active meta data management module configured to manage the active meta hash, UTXOs, and related customer information.

By way of non-limiting disclosure, FIG. 1 depicts a sample, functional, architectural-block diagram showing sample interactions, steps, functions, and components of a process, method, system, and apparatus for active meta data based transaction amalgamation offset in blocks to increase carbon efficiency involving users initiating and completing cryptocurrency transactions in accordance with one or more aspects described herein.

As shown in FIG. 1, process 100 amalgamates transactions using common active meta data between customers conducting digital transactions or cryptocurrency transactions. As previously discussed, amalgamation offset in blocks increases carbon efficiency by reducing overall energy requirements. For example, a typical transaction may require 15 bytes, but in reality, the transaction may only occupy 8 bytes. Thus, 7 bytes are wasted and more blocks are used due to the transactions occupying more space than needed. The process and apparatus, as disclosed herein, may merge or amalgamate another transaction that only occupy 7 bytes. Therefore, the two transactions may be amalgamated into a single transaction occupying 15 bytes. Typically, cryptocurrency transactions are wasting 50-55% of space on a block. Again, the goal of the process and apparatus disclosed herein is to create a block that can maximize the transaction storage data. By using common information between customers and transactions (i.e., common meta data), the multiple transactions can be amalgamated into a single transaction. In some examples, the process and apparatus disclosed herein may nearly double the storage of transaction data on a block thereby improving carbon efficiency.

At step 101, multiple customers or users may initiate a cryptocurrency transaction via a digital interface such as a mobile phone, iPad, or other computing device known in the art.

At step 102, the transaction and related asset value or amount may be transmitted to a crypto transaction queue or memory pool. The amount may be represented as a UTXO, as discussed above, the spend amount and how much a customer has to spend. At step 103 the UTXO retrieval application program interface (API) module may be used to access a database to determine available UTXO for each customer. At step 104, the UTXO retrieval API may access a UTXO management database to store and retrieve customer information including UTXO available, related transaction data, and assets available for transfer to third parties.

At step 105, the customer information retrieved by the UTXO retrieval API may be transmitted to the transaction amalgamator. The transaction amalgamator may determine the transaction size and related block size that has been specified for the particular cryptocurrency transaction platform. The transaction amalgamator may determine the other transactions that may also be merged to fit on the determined block size.

At step 106, common meta data between the multiple transactions may be used to identify the particular transactions that may be merged or amalgamated into a single transaction on the particular block. The transaction meta data may include customer information, recipient information, amount of the transaction, or other information that may be used to identify common data. At step 106, the transaction data is sent to an active data module that may identify common active meta data for the combined transaction to be used to generate active meta data hash for the single combined transaction. The active meta data hash may include information about the multiple transaction UTXO, sender information, receiver information, transaction amount per individual as per the retrieved UTXO, and a combined amount for the amalgamated transaction.

The combined active meta data hash for the amalgamated transaction is transmitted to an active metadata management system at step 107. Via the active meta data hash, the management system may identify the counterparts needing a credit and may prepare the data for addition to the ledger. At step 108, the amalgamated transactions may be converted by the active meta data system into a single transaction that may be generated having multiple UTXO.

At step 109, the single transaction may be added to the block. Once the block is full, it may be transmitted to validation nodes.

At step 110, the full block is transmitted to transaction validation nodes. The block meta data hash containing the merged transaction data needs to be validated using the sender information, counterpart information, value information, etc. at step 111. Validation may include determination if the sender is valid, the receiver is valid, the amount is valid, and the transaction is valid. The validation may be executed by a process called smart contracts. Smart contracts may be thought of as digital ethics and a set of instructions used to determine and validate if a transaction is legitimate. The transaction validation nodes may execute the instructions for smart contracts to determine the trust worthiness of the block. If the nodes agree that the block is correct, the nodes may approve the transaction for persistence.

At step 112 the validated and authorized transaction comprising multiple UTXO may be generated, based upon the active meta data hash, and may be added to the digital ledger with a different UTXO in accordance with the generated active meta hash. The UTXO retrieval API module or a separate UTXO creation API module may be used to split the transaction into multiple parts for the respective counterparts, and then the ledger may be updated appropriately.

At step 113 the entry may be added to the UTXO management database. And at step 114, the individual customer wallets may be updated upon termination and completion of the transaction(s). When the transactions are sent to the customer at step 114, it will need to be signed with the script unlock since the transactions are signed and locked.

Figure 2:
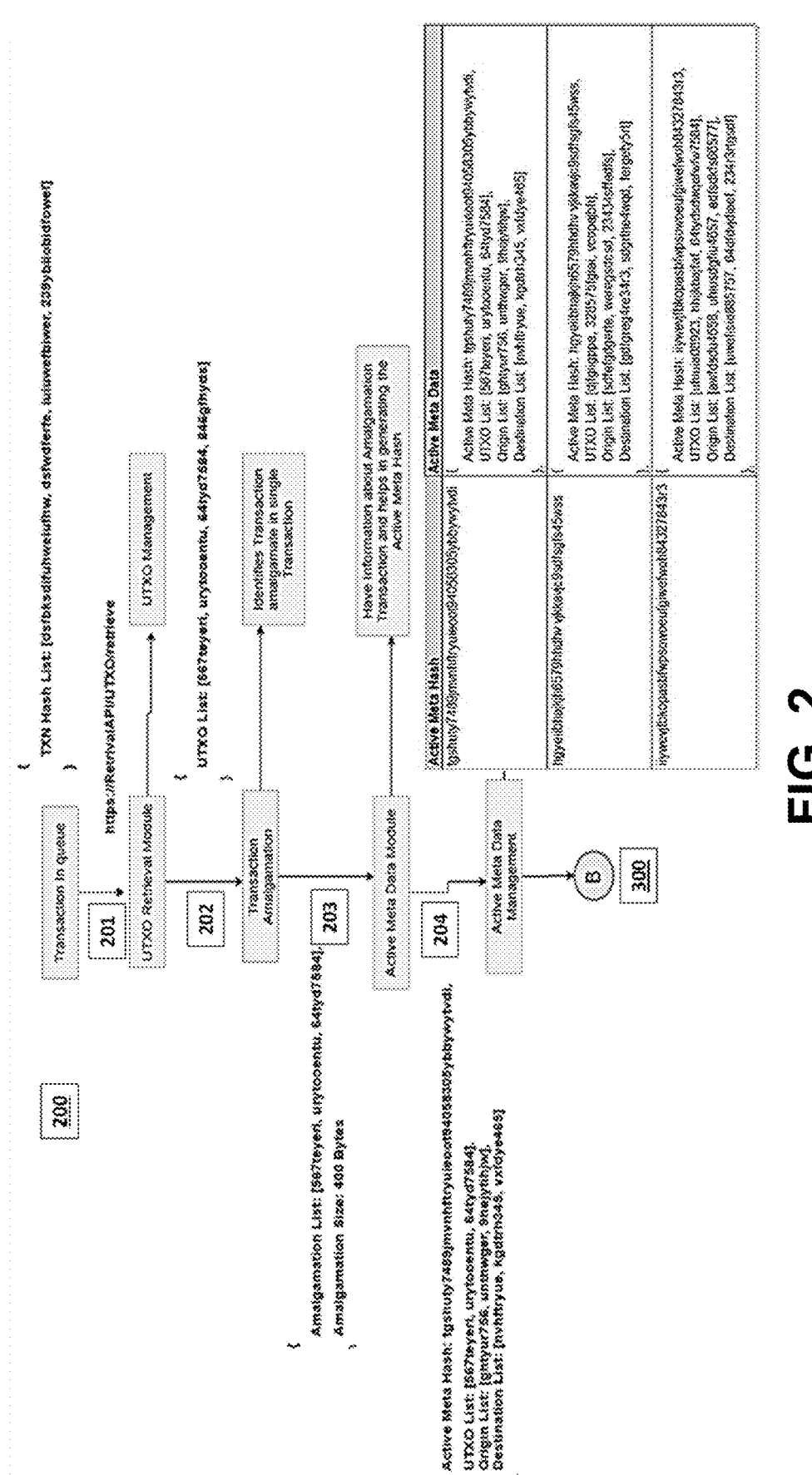
FIG. 2 depicts the dataflow for a process and apparatus for active meta data based transaction amalgamation offset in blocks to increase carbon efficiency in accordance with one or more aspects described herein.
Figure 3:
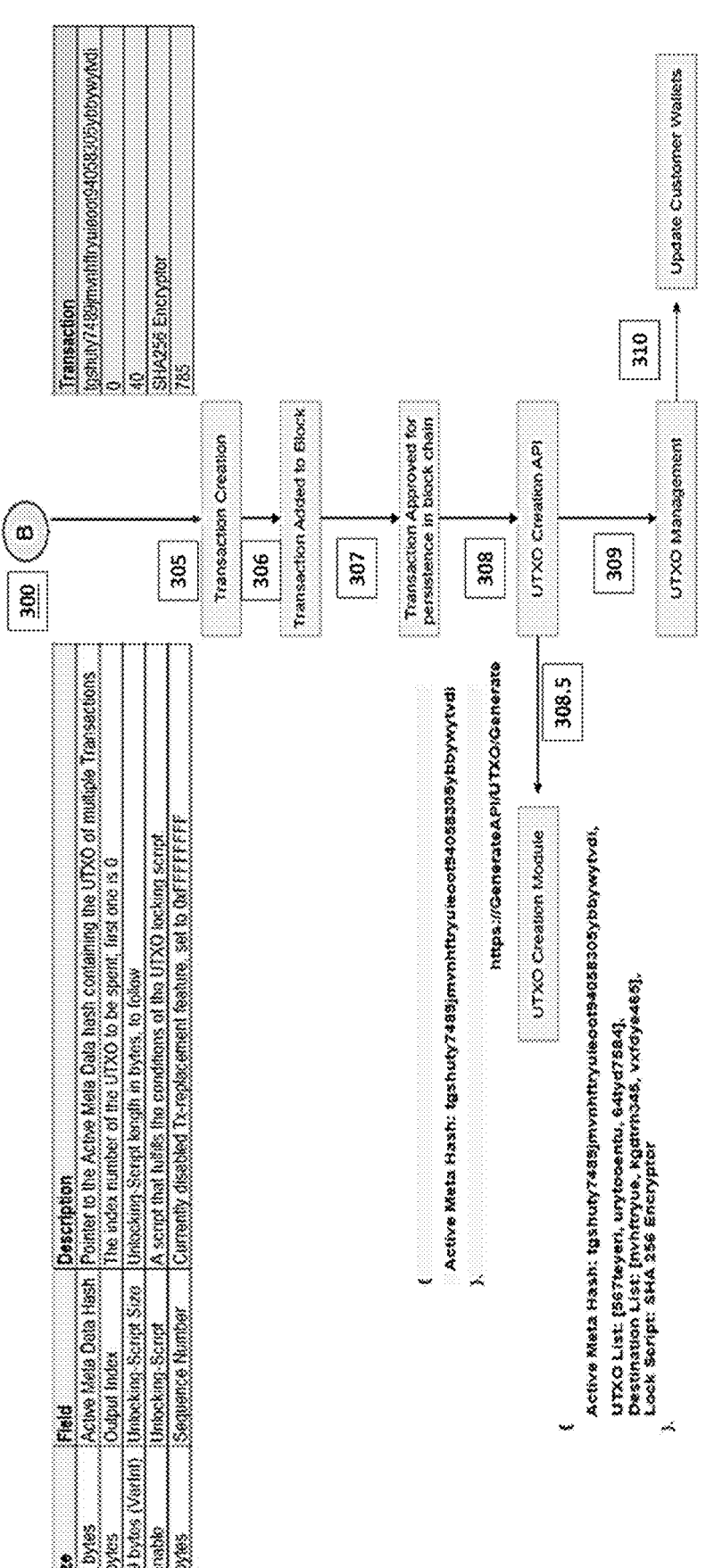
FIG. 3 depicts a continuation of the dataflow for a process and apparatus for active meta data based transaction amalgamation offset in blocks to increase carbon efficiency as depicted in FIG. 2 and in accordance with one or more aspects described herein.

By way of non-limiting disclosure, FIGS. 2 and 3 depict the dataflow for a process and apparatus for active meta data based transaction amalgamation offset in blocks to increase carbon efficiency in accordance with one or more aspects described herein. More particularly, active meta hash data amalgamation is shown.

The transaction queue of dataflow 200 is depicted with four transactions in the queue. At step 201 the UTXO information is retrieved from the UTXO Retrieval API module from the UTXO management database. In this particular example, the required block for a single transaction may hold 400 bytes.

At step 202, the information for the four transactions is sent to the transaction amalgamator. The transaction amalgamator determines that three of the transactions, depicted as the Amalgamation List, may be merged into a 400 byte transaction depicted as Amalgamation Size.

At step 203, the data for the Amalgamation List and the Amalgamation Size is sent to the active meta data module. The active meta data module will generate the active meta data hash from the Amalgamation List and related information. As depicted in FIG. 2, the Active Meta Data Hash is shown for the three transactions, the UTXO List, the Origin List, and the Destination List.

At step 204, the active meta data hash is sent to the active meta data management system. The active meta data management system creates a table that may include the active meta hash and corresponding active meta data for the three transactions as shown in FIG. 2.

By way of non-limiting disclosure, FIG. 3 depicts dataflow 300 that is a continuation of the dataflow for the process and apparatus for active meta data based transaction amalgamation offset in blocks to increase carbon efficiency as shown in FIG. 2.

At step 305, the active meta data management system creates a single transaction comprising the multiple UTXO from the active meta hash and corresponding active meta data for the three transactions. The amalgamated meta data hash is depicted as the Transaction data table in FIG. 3.

At step 306, the generated single transaction and related meta data hash is added to the block.

At step 307, the transaction is sent to the validation nodes for approval for persistence in the block chain.

At step 308, the validated transaction is sent to a UTXO creation API module to reverse the amalgamated transaction to retrieve the customer related information, counterpart related information, etc. for the three individual transactions. At step 308.5, a UTXO creation module is accessed to determine customer related information, counterpart related information, etc. for the three individual transactions. The active meta hash for the three transactions is depicted in FIG. 3 including the UTXO List, Destination List, and Lock Script for the required encryptor.

At step 309, the entries are added to the digital ledger and saved in the UTXO management database.

At step 310, the wallets for the three customers are updated for the transactions.

Figure 4:
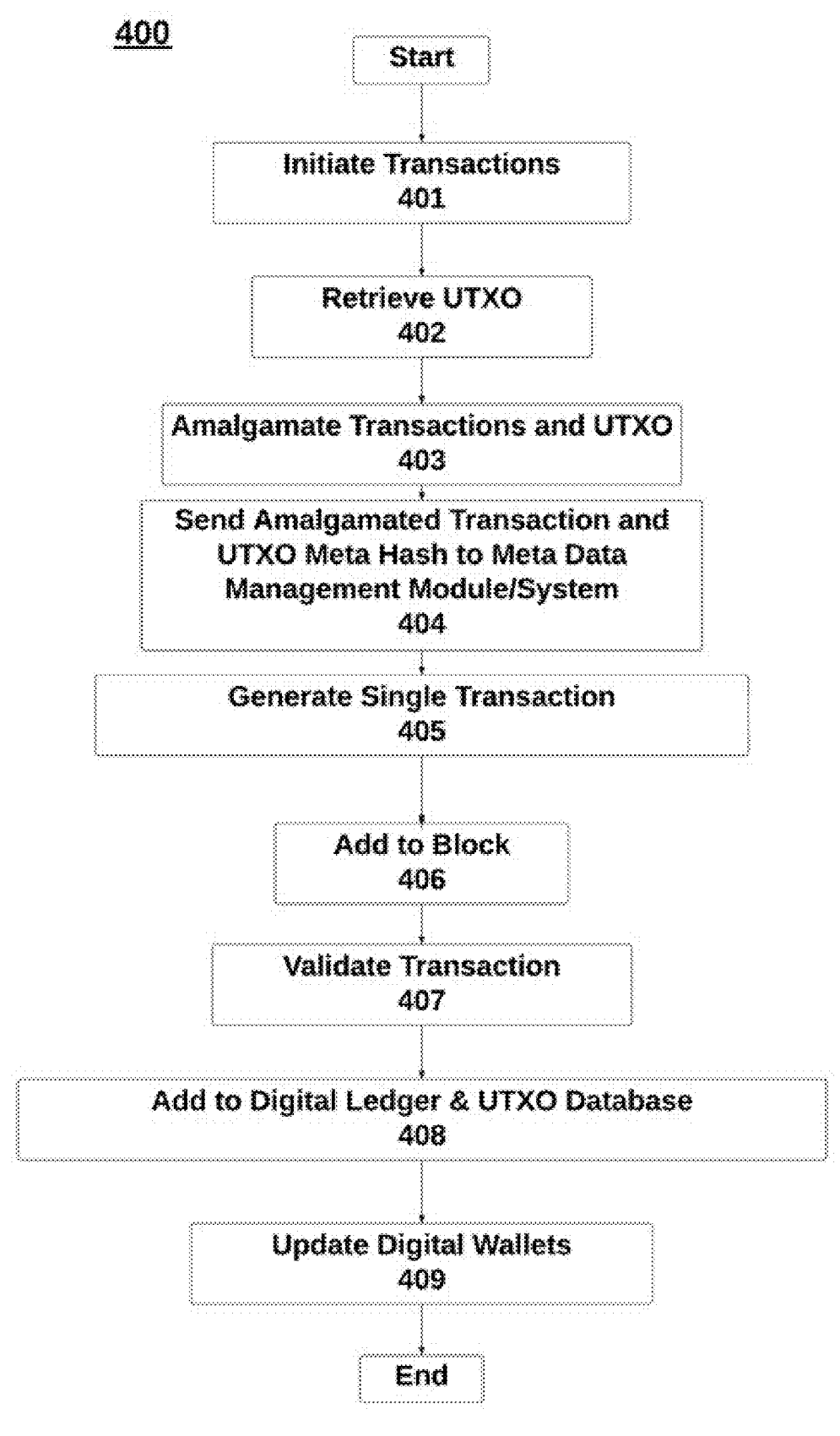
FIG. 4 depicts a process to amalgamate transaction blocks using active meta data to increase carbon efficiency in accordance with one or more aspects described herein.

By way of non-limiting disclosure, FIG. 4 depicts process 400 to amalgamate transaction blocks using active meta data to increase carbon efficiency in accordance with one or more aspects described herein.

At step 401, at least two customers may initiate a cryptocurrency transaction.

At step 402, a UTXO retrieval application program interface (API) module may be used to access a database to determine available UTXO for each customer.

At step 403, the customer information and corresponding UTXO retrieved by the UTXO retrieval API may be transmitted to the transaction amalgamator. The transaction amalgamator may determine the data that may also be merged to fit on a required block size.

At step 404, combined active meta data hash for the amalgamated transaction and UTXO is transmitted to an active metadata management system. Via the active meta data hash, the management system may identify the counterparts needing a credit and may prepare the data for addition to the ledger.

At step 405, the amalgamated transactions and related UTXO may be converted by the active meta data management system into a single transaction that may be generated having multiple UTXO.

At step 406, the single transaction may be added to the block.

At step 407, the block is transmitted to transaction validation nodes. Validation may include determination if the sender is valid, the receiver is valid, the amount is valid, and the transaction is valid. If the nodes agree that the block is correct, the nodes may approve the transaction.

At step 408 the validated and authorized transaction and multiple UTXO may be added to the UTXO management database and digital ledger.

At step 409, the individual customer wallets may be updated upon termination and completion of the transaction.

One or more aspects discussed herein may be embodied in computer-usable or readable data and/or computer-executable instructions, such as in one or more plugins, executed by one or more computers or other devices as described herein. Generally, plugin include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the plugin may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A process for decreasing a carbon footprint of cryptocurrency transactions comprising the steps of:

initiating a plurality of transactions by multiple customers through a digital interface;

retrieving an Unspent Transaction Output (UTXO) via a UTXO retrieval module for the plurality of transactions;

determining a required transaction block size via a transaction amalgamator;

amalgamating the plurality of transactions via the transaction amalgamator based on active metadata and the required block size;

sending an amalgamated transaction comprising an amalgamated UTXO to an active meta data module;

generating an active meta hash for a combined single transaction and the amalgamated UTXO;

generating a single transaction comprising multiple UTXO;

adding the single transaction comprising multiple UTXO to a block, wherein an entire data storage capacity of the block is utilized reducing an overall energy requirement of the plurality of transactions, and wherein a carbon footprint of the plurality of transactions is decreased by the reduced overall energy requirement;

validating the single transaction comprising multiple UTXO via a decentralized network of nodes;

adding transaction entries into a digital ledger and an UTXO management database utilizing the active meta hash for the single transaction comprising multiple UTXO;

updating digital wallets of the multiple customers with transaction outcomes, including a success or a failure status and updated asset balances.

2. The process of claim 1, wherein the cryptocurrency is Bitcoin.

3. The process of claim 1, wherein the cryptocurrency is an altcoin.

4. The process of claim 1, wherein the combined transaction active meta hash comprises information related to a combined UTXO of the customers, sender information, receiver information, individual UTXO per customer.

5. The process of claim 1, wherein the single transaction comprising multiple UTXO is generated to meet the required block size.

6. The process of claim 5, wherein the transaction amalgamator selects and merges common data between the plurality of transactions by multiple customers to meet the required block size.

7. The process of claim 1, wherein the generated active meta hash replaces a 32-byte transaction hash.

8. The process of claim 1, wherein amalgamating the plurality of transactions and generating the single transaction comprising multiple UTXO optimizes network bandwidth.

9. The process of claim 1, further comprising calculating a combined transaction amount and generating a composite transaction record that retains detailed information of individual transactions, including sender and receiver details, individual transaction amounts per UTXO, and an aggregated transaction amount.

10. The process of claim 1, wherein a number of required blocks is minimized.

11. A computing apparatus configured to decrease a carbon footprint of cryptocurrency transactions comprising:

at least one processor; and memory storing computer-readable instructions that, when executed by the at least one processor, cause the computing apparatus to:

initiate a plurality of transactions by multiple customers through a digital interface;

retrieve an Unspent Transaction Output (UTXO) via a UTXO retrieval module for the plurality of transactions;

determine a required transaction block size via a transaction amalgamator;

amalgamate the plurality of transactions via the transaction amalgamator based on active metadata and the required block size;

transmit an amalgamated transaction comprising an amalgamated UTXO to an active meta data module;

generate an active meta hash for a combined single transaction and the amalgamated UTXO;

generate a single transaction comprising multiple UTXO;

add the single transaction comprising multiple UTXO to a block, wherein an entire data storage capacity of the block is utilized reducing an overall energy requirement of the plurality of transactions, and wherein a carbon footprint of the plurality of transactions is decreased by the reduced overall energy requirement;

validate the single transaction comprising multiple UTXO via a decentralized network of nodes;

add transaction entries into a digital ledger and an UTXO management database utilizing the active meta hash for the single transaction comprising multiple UTXO;

update digital wallets of the multiple customers with transaction outcomes, including a success or a failure status and updated asset balances.

12. The apparatus of claim 11, wherein the cryptocurrency is Bitcoin.

13. The apparatus of claim 11, wherein the cryptocurrency is an altcoin.

14. The apparatus of claim 11, wherein the transaction amalgamator selects and merges common data between the plurality of transactions by multiple customers to meet the required block size.

15. The apparatus of claim 14, wherein the generated active meta hash replaces a 32-byte transaction hash.

16. The apparatus of claim 15, wherein amalgamating multiple transactions from different customers into the single transaction comprising multiple UTXO optimizes network bandwidth.

17. The apparatus of claim 16, wherein a number of required blocks is minimized.

18. A non-transitory machine-readable medium storing instructions that, when executed by one or more processors, cause the one or more processors to perform steps comprising:

initiate a plurality of cryptocurrency transactions via a digital interface for multiple users;

retrieve Unspent Transaction Output (UTXO) via a UTXO retrieval module for the plurality of transactions;

determine a required transaction block size via a transaction amalgamator;

amalgamate the plurality of transactions via the transaction amalgamator based on active metadata and the required block size;

send an amalgamated transaction comprising an amalgamated UTXO to an active meta data module;

generate an active meta hash for a combined single transaction and the amalgamated UTXO;

generate a single transaction comprising multiple UTXO;

add the single transaction comprising multiple UTXO to a block, wherein an entire data storage capacity of the block is utilized reducing an overall energy requirement of the plurality of transactions, and wherein a carbon footprint of the plurality of transactions is decreased by the reduced overall energy requirement;

validate the single transaction comprising multiple UTXO via a decentralized network of nodes;

add transaction entries into a digital ledger and an UTXO management database utilizing the active meta hash for the single transaction comprising multiple UTXO;

update digital wallets of the multiple users with transaction outcomes, including a success or a failure status and updated asset balances.

* * * * *